United States Patent Office 2,883,369
Patented Apr. 21, 1959

2,883,369

SURFACE-ACTIVE AGENTS DERIVED FROM ACRYLATES AND METHACRYLATES

Richard W. Rees, Shawinigan Falls, Quebec, Canada, assignor to Shawinigan Chemicals Limited, Montreal, Quebec, Canada, a corporation of Canada No Drawing. Application April 19, 1956
Serial No. 579,168

4 Claims. (Cl. 260—79.3)

This invention relates to new surface-active agents and to the process for preparing them.

It has previously been discovered that monomeric lower alkyl esters of acrylic and methacrylic acids containing up to ten carbon atoms in the alkyl group can be emulsified in aqueous medium containing small effective proportions of sulphur dioxide and tertiary alkyl aromatic hydroperoxide; the resultant monomeric emulsions are substantially stable, and the monomer therein can be polymerized to give a stable aqueous polymer emulsion which remains stable without the addition of any protective colloid. There appears to be an interaction between the monomeric acrylic or methacrylic ester, sulphur dioxide, and the hydroperoxide which results in a surface-active effect, stabilizing both the monomer and polymer emulsions.

It has now been found that highly effective surface-active agents can be prepared by reacting a monomer of the group consisting of acrylic acid, methacrylic acid, acrylonitrile, methacrylonitrile, and lower alkyl esters of the said acids having up to 10 carbon atoms in the alkyl group, with sulphur dioxide and one of a group of organic peroxy compounds. The products, which are strongly acid in reaction, and contain sulphonic groups, are effective oil-soluble emulsifying and stabilizing agents, particularly for vinyl acetate and acrylic esters. The acidic products can be neutralized with suitable alkali under suitable conditions to form neutral salts which also are effective as emulsifying and stabilizing agents. The acidic products and their salts can be used to emulsify water-immiscible monomers, for example vinyl acetate and alkyl acrylate esters, in water to form stable monomer emulsions which in turn can be polymerized to form stable polymer emulsions. Polyvinyl acetate emulsions containing one of the acidic products or their salts as the sole surface-active component give films with excellent clarity, gloss and water resistance. The products can also be substituted for previously known wetting agents used in the formulation of polymer emulsions in conjunction with other materials such as stabilizers.

The acidic products derived from acrylic esters are generally viscous oils or gums, resembling low molecular weight polyacrylates; they are soluble in most organic solvents including monomers such as vinyl acetate and alkyl acrylate esters, and insoluble or only slightly soluble in water. Among the salt products, the polymethyl acrylate sodium sulphonates are water soluble, while the corresponding materials prepared from ethyl, butyl and 2-ethyl-hexyl acrylates are soluble only in organic solvents. The salts can be cast from solution to give clear, reasonably strong, flexible films.

The invention thus comprises in its broadest aspect the new products prepared by reacting a monomer of the group consisting of acrylic acid, methacrylic acid, acrylonitrile, methacrylonitrile, and lower alkyl esters of the said acids having up to 10 carbon atoms in the alkyl group, with sulphur dioxide and an organic peroxy compound of the group consisting of organic hydroperoxides and methyl ethyl ketone peroxide, and optionally, neutralizing to form a salt; the invention further comprises the process for preparing these products.

The reaction forming the acidic products of the invention seems to involve the formation of a relatively short polymer chain terminated at one or both ends by a sulphonic group ($-SO_3H$), but the scope of the invention is not to be limited by any theoretical reaction mechanism. Specific examples of hydroperoxides suitable for use in the invention are: tert-butyl hydroperoxide, cumene hydroperoxide, para-menthane hydroperoxide, diisopropylbenzene hydroperoxide, and tert-butyl isopropylbenzene hydroperoxide. Methyl ethyl ketone peroxide, which is an organic peroxide but not a hydroperoxide, can be used instead of an organic hydroperoxide.

The reaction should be conducted at a temperature below 60° C., and is preferably carried out below —10° C. A suitable temperature range is —10° to —20° C. The reaction rate is higher at —60° C. than at —50° C. However, at these lower temperatures the reaction appears to be inhibited by ice crystals, which must be removed before the reaction will take place. At temperatures below —20° C. it is preferable to use reactants that are free from water.

One procedure for conducting the reaction is to dissolve the organic peroxy compound in the monomer, cool the solution to —20° C., and add liquid sulphur dioxide slowly with stirring. The reaction mixture thickens very rapidly, and the product forms as a viscous liquid or gum. The excess sulphur dioxide and unreacted monomer can be removed by distilling under pressure reduced below atmospheric.

The reaction procedure can be varied by dissolving the sulphur dioxide in the monomer at a suitable temperature and slowly adding the organic peroxy compound. Substantially identical products are obtained by the two procedures, but the first mentioned one is preferred.

Gaseous sulphur dioxide can be employed in place of liquid sulphur dioxide; it gives a less violent reaction which is more readily controlled. The gaseous sulphur dioxide can conveniently be bubbled into a mixture of the monomer and organic peroxy compound.

A solvent, such as methanol, can be used in the reaction mixture so that the product will remain in solution during the removal of unreacted monomer and excess sulphur dioxide. The removal of excess reactants can then be accomplished, for example, by heating the crude product in a tube and shell heat exchanger under pressure reduced below atmospheric.

The following Examples 1–20 illustrate the process and products of this invention. These examples are illustrative only and in no way limit the spirit or scope of the invention.

*Example 1*

|  | Ml. |
|---|---|
| Butyl acrylate | 40 |
| Cumene hydroperoxide (commercial, 72% solution in cumene) | 3 |
| Sulphur dioxide (liquid) | 40 |

The cumene hydroperoxide was dissolved in the butyl acrylate monomer in a round-bottom flask, and the solution was stirred at —20° C. while the sulphur dioxide, also cooled to —20° C., was added slowly. A strongly exothermic reaction occurred as the first drops of sulphur dioxide were added from a pipette and the viscosity of the reaction mixture rose very sharply. After the first 5 ml. of sulphur dioxide had been added, no further reaction took place and the viscosity decreased, due to dilution. After the addition was completed, the mixture was maintained at room temperature for 30 minutes while most of the excess sulphur dioxide evaporated. The unreacted butyl acrylate was then removed by heating on a steam bath at an absolute pressure of 18 mm. mercury. The final product was a brown, viscous gum, soluble in acetone, methanol and chlorinated solvents. The interfacial tension between a 0.1% solution of the product in benzene and water was 10 dynes/cm. at 20° C., contrasted with 35 dynes/cm. for pure benzene and water. This product was used as the sole emulsifying and stabilizing agent in preparing the polyvinyl acetate emulsions described in Example 21.

Example 2

Methyl acrylate, 400 ml., was mixed with 30 ml. cumene hydroperoxide (72% solution in cumene) in a round-bottom flask and the stirred mixture was cooled to −20° C. Liquid sulphur dioxide, 100 ml., cooled to the same temperature, was added over a period of about one hour. The first 20 ml. was added very cautiously since a violent exothermic reaction took place after each small addition. The mixture thickened immediately after the addition of the first 2 ml. of sulphur dioxide, and finally became a viscous yellow gum. After the addition of sulphur dioxide was completed, the crude product was allowed to stand at room temperature for 30 minutes and then subjected to evaporation under an absolute pressure of 20 mm. mercury using water bath temperatures of up to 100° C. A mixture, amounting to 87 ml., of excess sulphur dioxide and unreacted methyl acrylate was removed from the product.

A sample of the gummy acidic product weighing 3.40 grams was then withdrawn from the flask, dissolved in methanol and titrated with 0.092 N sodium hydroxide in methanol. Two end points were obtained, the first at pH 1.8 corresponding to 22 ml., and the second at pH 8.6 to 43 ml. of alkali solution. Ethane sulphonic acid and propionic acid were then titrated with sodium hydroxide in methanol for comparison, and were found to give end points at pH 1.7 and 8.6 respectively. It therefore appeared that the first end point of the acidic product was due to sulphonic groups and the second to carboxylic groups. On this basis, the content of sulphonic groups in the gummy product was 4.8%. Gravimetric sulphur analyses were in good agreement with this value. It was concluded that the sulphur present in the methyl acrylate-based surface-active agents is all combined in the form of sulphonic groups and, further, that in the case of the methyl acrylate derivatives, an approximately equal number of sulphonic and carboxylic groups are present.

The remaining material in the flask, weighing 342 grams, was dissolved in 1500 ml. of acetone and stirred while 16.0 grams of sodium hydroxide dissolved in 200 ml. methanol was added at room temperature. The initially clear, orange-colored solution became light yellow and cloudy after the addition. About 500 ml. of solvent was then removed by distillation on a steam bath. Of the remaining 1190 ml. of solution, 10 ml. was dried, and the dried material weighed 2.94 grams indicating a total yield of 350 grams.

About half of the solution was used to cast a film, 2 mils (0.002 inch) thick when dry, on waxed paper using a film-casting machine. The film was easily stripped from the paper, and was found to be practically colorless, coherent, flexible and reasonably strong. The film dissolved almost instantly in water.

The remaining half of the solution was air dried on a large tray. The product was a clear, light yellow gum, harder and less sticky than the initial acidic reaction product. It was readily soluble in water and acetone and to a lesser extent in methanol and other organic solvents. The surface tension of a 0.1% solution in water was 42 dynes/cm. This sodium salt was used as the sole emulsifier and stabilizer for the preparation of a 50% solids polyvinyl acetate emulsion. Details are given in Example 22.

Examples 3–14

The procedure used in all the runs summarized below was to dissolve the 72% cumene hydroperoxide solution in the acrylic ester at a temperature of about −20° C. and add liquid sulphur dioxide slowly with stirring.

METHYL ACRYLATE

|   | Acrylate Ester (Grams) | Cumene Hydroperoxide (Grams Solution) | Sulphur Dioxide (Grams) | Percentage of SO$_3$H in Product |
|---|---|---|---|---|
| 3 | 40 | 5.7 | 2.4 | 4.9 |
| 4 | 40 | 5.7 | 5.6 | 4.9 |
| 5 | 40 | 5.7 | 11.2 | 5.2 |
| 6 | 40 | 8.7 | 16.8 | 6.2 |
| 7 | 40 | 10.2 | 16.8 | 6.5 |
| 8 | 40 | 2.8 | 2.8 | 3.2 |
| 9 | 40 | 2.3 | 5.6 | 3.1 |
| 10 | 40 | 2.1 | 14.0 | 4.9 |
| 11 | 40 | 2.1 | 7.0 | 4.2 |

ETHYL ACRYLATE

|   | | | | |
|---|---|---|---|---|
| 12 | 40 | 2.1 | 14.0 | 2.9 |

BUTYL ACRYLATE

|   | | | | |
|---|---|---|---|---|
| 13 | 40 | 2.1 | 14.0 | 2.7 |

2-ETHYLHEXYL ACRYLATE

|   | | | | |
|---|---|---|---|---|
| 14 | 40 | 2.1 | 14.0 | 2.7 |

All the acidic products prepared in Examples 3–14 had surface-active properties.

The percentage of sulphonic groups was calculated from the titration with 0.1 N sodium hydroxide solution in methanol, using a pH meter. The acidic products based on methyl and ethyl acrylates gave two end-points indicating both sulphonic and carboxylic groups, while the products from the higher esters gave only one end-point, indicating that they contained sulphonic groups only. Titration results obtained from methyl acrylate-based products indicated a sulphonic to carboxylic ratio of about 1:1, while ethyl acrylate-based products gave a sulphonic to carboxylic ratio of 1:0.3 The first end-point could also be obtained by titrating the acidic product with 0.1 N sodium hydroxide in methanol, using Fleisher's methyl purple as indicator, and the second end-point could be obtained by using phenolphthalein as the indicator.

The sodium salts of the products described in Examples 6 and 7 were prepared by adding a solution of the calculated amount of sodium hydroxide in methanol to a solution of the acidic product also in methanol. The properties of these materials were generally identical with those of the salt prepared in Example 2 except that their effects in lowering surface tension were slightly more pronounced.

An alternative neutralizing procedure is to emulsify the acidic reaction product in hot water by stirring and then add the required quantity of sodium hydroxide to give an aqueous solution of the sodium salt.

The sodium salts based on the methyl acrylate products containing 5–6% sulphonic groups (as in Examples 3–6) gave more stable emulsions than did the products containing 2–3% sulphonic groups. Products containing 10% sulphonic groups are very viscous. The sodium salts of products containing about 5% sulphonic acid groups are not sticky and can form films which are easily handled.

The sodium salts of the acidic products described in Examples 12, 13, and 14 were also prepared. These products were insoluble in water and soluble in most organic solvents except hydrocarbons. Tests indicated that they are effective emulsifying and stabilizing agents.

The ammonium and potassium salts are similar to the sodium salt in surface-active properties. The ammonium salt can be made by bubbling ammonia into a methanol solution of the polymer.

A sample of the product prepared in Example 10 was converted into the barium salt. The procedure used was to stir an ethylene dichloride solution of a polymethyl acrylate sulphonic acid with an aqueous solution of barium hydroxide octahydrate. The product was a tough, rubbery material, insoluble in water. It dissolved very slowly in acetone and chlorinated solvents, and was insoluble in hydrocarbons and lubricating oil. The behavior of this material suggests that some cross-linking had occurred.

*Examples 15 and 16*

The same quantities of reactants as in Examples 3 and 4 were brought together by a different procedure, whereby liquid sulphur dioxide was dissolved in the methyl acrylate and the cumene hydroperoxide added slowly. The reaction was very vigorous, and reproduction of temperature conditions was difficult. The percentage of sulphonic groups in both products obtained by this alternative procedure was 2.4%, contrasting with 4.9% in Examples 3 and 4; hence the method used for Examples 3 and 4 is preferable, since the material with the lower proportion of sulphonic groups is a less effective surface-active agent.

*Example 17*

Acrylic acid was substituted for methyl acrylate in Example 10. The acidic product obtained was a water-soluble low molecular weight material, containing about 1% sulphonic groups, and having surface-active properties.

*Example 18*

Acrylonitrile was substituted for methyl acrylate in Example 10. The reaction was violent, and a hard, white solid which is surface-active and water soluble, was obtained. The acidic product precipitated from the reaction mixture, apparently being insoluble in the monomer in the absence of a solvent. The remaining liquid was of low viscosity.

*Example 19*

Into a round-bottom flask there were placed 1000 ml. methanol, 400 ml. methyl acrylate and 50 ml. cumene hydroperoxide (72% solution in cumene). The mixture was stirred and cooled to —10° C. in a bath maintained at —10° C. throughout the preparation. Sulphur dioxide gas was bubbled gently through the solution while stirring was continued.

Approximately one minute after the addition of sulphur dioxide was begun, the solution became cloudy. The temperature of the mixture rose slowly and the cloudiness disappeared. The solution became viscous and eventually reached a temperature of 55° C., at which point it became cloudy again and the temperature dropped gradually to 20° C. Sulphur dioxide was bubbled through continuously and in about 5 minutes after the second period of cloudiness had begun, the solution became clear again.

Thirty minutes after the beginning of the preparation, air was blown through the solution at —20° C. to liberate excess sulphur dioxide. Practically all the excess sulphur dioxide had been dissipated after air had been blown through the mixture for about 3 hours. Part of the polymeric product separated from the solution. When the mixture was warmed on a steam bath the separated material redissolved with stirring. A sample was taken and evaporated, and the residual dried viscous polymer was analyzed for sulphonic and carboxylic groups the same as in Example 2. The content of sulphonic groups was 6.3%, and of carboxyl groups also about 6.3%. The acidic material was neutralized with a calculated amount of sodium hydroxide in methanol, and a salt obtained by evaporation of the methanol. The salt was soluble in water and to a limited extent in vinyl acetate, and was effective in lowering the surface tension of each of these liquids. The salt was stickier than that of Example 2, indicating a lower molecular weight.

*Example 20*

Methyl methacrylate, 40 ml., was placed in a round-bottom flask, 3 ml. of 72% cumene hydroperoxide solution and 40 ml. acetone were added, and sulphur dioxide was bubbled through the mixture at room temperature. After about 30 minutes the solution had become slightly viscous and had turned brown in color. The acetone was then evaporated from the mixture on a steam bath and a vacuum applied to remove unreacted monomer, leaving a dark brown viscous material. This product was analyzed as in Example 2 and found to contain 5% sulphonic groups and 0.5% carboxylic groups. The product was soluble in vinyl acetate, methyl acrylate and common organic solvents and was a surface tension depressant.

Tests were carried out in which monomeric vinyl acetate-water emulsions were prepared under standard conditions using as emulsifiers either one of the wetting agents prepared in Examples 1 and 2 or a commercial wetting agent. The breaking times of these emulsions were compared. The results indicated that the acrylate-based materals, as emulsifiers for monomeric vinyl acetate, are greatly superior to a commercial emulsifier which is a condensate of ethylene oxide with a hydrophobic base formed by condensing propylene oxide with propylene glycol, and also somewhat better than another common commercial wetting agent which is the dioctyl ester of sodium sulphosuccinic acid.

*Example 21*

A polyvinyl acetate emulsion was prepared as described below, in which a butyl-acrylate based surface-active agent, prepared as described in Example 1 above, was the only emulsifying and stabilizing agent. The emulsion showed good film properties. The ingredients for the emulsion were as follows:

Water _____ml__ 300
Wetting agent from Example 1 _____grams__ 5
Vinyl acetate, initial _____ml__ 100
Vinyl acetate, delayed _____ml__ 175
Potassium persulphate _____gram__ 1

The wetting agent was dissolved in the total vinyl acetate monomer. The potassium persulphate, water, and initial wetting agent-vinyl acetate solution were charged to a kettle, and heated to 65° C. to start polymerization. The kettle was of one liter capacity, heated externally by a water bath and equipped with a reflux condenser and stirrer turning slowly. The induction period, during which vinyl acetate refluxed, was about 15 minutes; at the end of this period addition of the delayed monomer was started, and the temperature taken to 80° C. and maintained there until completion of polymerization. The properties of the emulsion were as follows:

Solids content _____percent__ 43
Particle size, average _____microns__ 0.3
Viscosity _____centipoises__ 2
Residual monomer _____percent__ 0.21
Acid content (as acetic)_____do____ 0.7

The emulsion dried to give a clear, brittle film with good water resistance.

Other runs were carried out in which the wetting agent prepared in Example 1 was substituted for the di-(2-ethylhexyl) ester of sodium sulphosuccinic acid and dodecyl benzene sodium sulphonate respectively in two commercial polyvinyl acetate emulsion formulations. In both cases the polymerization proceeded smoothly and no deviations from the usual emulsion properties were noticed.

Example 22

The sodium salt product prepared in Example 2 was used as the sole wetting agent in preparing another polyvinyl acetate emulsion using the following ingredients:

| | |
|---|---|
| Water _____ml__ | 300 |
| Wetting agent from Example 2 _____grams__ | 6 |
| Vinyl acetate (initial) _____ml__ | 100 |
| Vinyl acetate (delayed) _____ml__ | 200 |
| Potassium persulphate _____grams__ | 1 |

The wetting agent was dissolved in the water, initial vinyl acetate and potassium persulphate were added, and the mixture heated to 65° C. to start polymerization. After the initial reflux had subsided the delayed vinyl acetate was added and polymerization continued at 80° C. After completing the addition and polymerization of vinyl acetate, the emulsion was cooled to room temperature. The properties of the emulsion were as follows:

| | |
|---|---|
| Solids content _____percent__ | 50 |
| Particle size _____microns__ | 0.15–0.2 |
| Viscosity _____centipoises__ | 2 |
| Residual monomer _____percent__ | 0.7 |
| Acid content (as acetic) _____do____ | 0.1 |

Films cast from the emulsion and dried had excellent clarity, gloss and water resistance. The film did not whiten in the presence of water during a period of about 15 minutes.

A methyl acrylate polymer emulsion was also prepared using the reactant proportions given in Example 22, with methyl acrylate substituted for vinyl acetate. This emulsion was more grainy than its vinyl acetate counterpart, but possessed similar good film properties with the added advantage of flexibility.

The over-all performance of the wetting agent from Example 2 as a polymer emulsion emulsifier and stabilizer was considered superior to that of any commercial or experimental product previously tested in a wide comparison of surface-active compounds.

It is obvious that many variations may be made in the products and processes of this invention without departing from the spirit and scope thereof as defined in the following claims.

What is claimed is:

1. A process for preparing a surface-active material which comprises reacting a mixture consisting of (A) sulphur dioxide, (B) a member of the group consisting of acrylic acid, methacrylic acid, acrylonitrile, methacrylonitrile, and lower alkyl esters of the said acids having up to ten carbon atoms in the alkyl group, said sulphur dioxide being present in the amount of at least 5% based on the weight of the total mixture, and (C) from 2.3 to 11%, by weight of the total mixture, of an organic peroxy compound of the group consisting of organic hydroperoxides and methyl ethyl ketone peroxide.

2. A process for preparing a surface-active material which comprises (1) reacting at a temperature between −60° C. and +60° C. a mixture consisting of (A) sulphur dioxide, (B) a member of the group consisting of acrylic acid, methacrylic acid, acrylonitrile, methacrylonitrile, and lower alkyl esters of the said acids having up to ten carbon atoms in the alkyl group, said sulphur dioxide being present in the amount of at least 5% based on the weight of the total mixture, and (C) from 2.3 to 11%, by weight of the total mixture, of an organic peroxy compound of the group consisting of organic hydroperoxides and methyl ethyl ketone peroxide, and (2) neutralizing the reaction product with alkaline material to form a salt.

3. The product containing up to 10% by weight of sulphonic acid groups and prepared by the process of claim 1.

4. The product containing up to 10% by weight of sulphonic groups and prepared by the process of claim 2.

References Cited in the file of this patent

UNITED STATES PATENTS

| | | |
|---|---|---|
| 2,202,791 | Fox _____ | May 28, 1940 |
| 2,454,543 | Bock _____ | Nov. 23, 1948 |
| 2,507,088 | Bradley _____ | May 9, 1950 |
| 2,524,084 | Rust _____ | Oct. 3, 1950 |
| 2,698,317 | Ross _____ | Dec. 28, 1954 |
| 2,703,793 | Naylor _____ | Mar. 8, 1955 |
| 2,778,812 | Dreisbach et al. _____ | Jan. 22, 1957 |
| 2,794,014 | Dreisbach et al. _____ | May 28, 1957 |

OTHER REFERENCES

Backer: Rec. Travaux Chimique Pays-Bas, 62, 46–52 (1943).